(12) United States Patent
Tang et al.

(10) Patent No.: US 10,882,700 B1
(45) Date of Patent: Jan. 5, 2021

(54) EMBEDDED SCRAPER ROTATION ANGLE DETECTION DEVICE FOR SCRAPER CONVEYOR AND DETECTION METHOD

(71) Applicants: China University of Mining and Technology, Jiangsu (CN); ANHUI UNIVERSITY OF SCIENCE AND TECHNOLOGY, Anhui (CN); HUAIHAI INSTITUTE OF TECHOLOGY, Jiangsu (CN)

(72) Inventors: Yu Tang, Jiangsu (CN); Zhencai Zhu, Jiangsu (CN); Gang Shen, Jiangsu (CN); Yongcun Guo, Anhui (CN); Xiang Li, Jiangsu (CN); Jinsong Chen, Jiangsu (CN); Tongqing Li, Jiangsu (CN); Dagang Wang, Jiangsu (CN); Guohua Cao, Jiangsu (CN); Wei Li, Jiangsu (CN); Gongbo Zhou, Jiangsu (CN); Yuxing Peng, Jiangsu (CN); Hao Lu, Jiangsu (CN)

(73) Assignees: China University of Mining and Technology, Jiangsu (CN); ANHUI UNIVERSITY OF SCIENCE AND TECHNOLOGY, Anhui (CN); HUAIHAI INSTITUTE OF TECHOLOGY, Jiangsu (CN)

( * ) Notice: Subject to any disclaimer, the term of this patent is extended or adjusted under 35 U.S.C. 154(b) by 0 days.

(21) Appl. No.: 16/967,735

(22) PCT Filed: Sep. 12, 2019

(86) PCT No.: PCT/CN2019/105655
§ 371 (c)(1),
(2) Date: Aug. 6, 2020

(30) Foreign Application Priority Data

Jun. 26, 2019 (CN) .......................... 2019 1 0560127

(51) Int. Cl.
*B65G 43/00* (2006.01)
*B65G 19/22* (2006.01)

(52) U.S. Cl.
CPC ............. *B65G 43/00* (2013.01); *B65G 19/22* (2013.01); *B65G 2203/0283* (2013.01); *B65G 2203/042* (2013.01)

(58) Field of Classification Search
CPC ... B65G 43/00; B65G 19/22; B65G 2203/042
See application file for complete search history.

(56) References Cited

U.S. PATENT DOCUMENTS 3,376,707 A * 4/1968 Dommann .......... E21D 23/0073
405/293

FOREIGN PATENT DOCUMENTS

| CN | 104925460 | 9/2015 |
|---|---|---|
| CN | 107218881 | 9/2017 |

(Continued)

OTHER PUBLICATIONS

CN-204057100-U (Year: 2014).*
CN-209367175-U (Year: 2019).*
CN-203450778-U (Year: 2014).*

*Primary Examiner* — Gene O Crawford
*Assistant Examiner* — Lester Rushin, III
(74) *Attorney, Agent, or Firm* — Winston Hsu

(57) ABSTRACT

The present invention discloses an embedded scraper rotation angle detection device for a scraper conveyor and a detection method. The detection device includes two extensible detection devices, two signal detection units and a remote processing unit. The two extensible detection devices and the two signal detection units are disposed at two ends of a scraper respectively. The signal detection units detect movement displacements of the extensible detection devices in real time and send out signals through wireless transmission modules, the wireless transmission modules (Continued)

and a wireless receiving module are used for data transmission, and a signal display processing module is used to calculate a rotation angle value of the scraper in real time, output and display the rotation angle value simultaneously, compare the rotation angle value measured in real time with a set safety threshold, and send out an alarm indication when the rotation angle value exceeds the safety threshold.

7 Claims, 3 Drawing Sheets

(56) References Cited

FOREIGN PATENT DOCUMENTS

| | | |
|---|---|---|
| CN | 109211087 | 1/2019 |
| CN | 109018851 | 6/2020 |

* cited by examiner

EMBEDDED SCRAPER ROTATION ANGLE DETECTION DEVICE FOR SCRAPER CONVEYOR AND DETECTION METHOD

FIELD OF THE INVENTION

The present invention relates to the field of scraper conveyors, in particular to an embedded scraper rotation angle detection device for a scraper conveyor and a detection method.

DESCRIPTION OF RELATED ART

As key equipment for mechanized coal mining in a fully mechanized coal mining face, scraper conveyors undertake the important tasks of conveying coal, providing operation tracks for coal mining machines and providing pushing fulcrums for hydraulic supports. The working principle of the scraper conveyors determines that the scraper conveyors need to bear the effects of tension and compression, local bending, time-varying loads, impact and the like in the operation process, and a severe working environment causes a serious corrosion phenomenon of key parts of the scraper conveyors, short service life of the key parts and high fault occurrence probability, reduces the startup rate of fully mechanized mining complete equipment, and seriously restricts the production efficiency of large coal mines in China.

In order to improve the reliability of the scraper conveyors, it is very necessary to monitor the states of the scraper conveyors in real time. The deep analysis shows that scrapers are always perpendicular to a trough ledge of a middle trough under an ideal operation state, when the scraper conveyors have faults such as chain loosening, chain skipping and chain breaking, the scrapers tend to produce a larger inclined rotation angle compared with an ideal operation condition, and the rotation angle information of the scrapers can be used for judging whether the scraper conveyors operate normally or not, but there is still a lack of a feasible detection technology for the rotation angle of the scrapers in the scraper conveyor operation process at home and abroad at present. Therefore, the real-time detection of the rotation angle of the scrapers in the dynamic operation of the scraper conveyors at the low cost has important significance for improving the operation safety of the scraper conveyors.

SUMMARY OF THE INVENTION

Technical Problem

A first object of the present invention is to provide an embedded scraper rotation angle detection device for a scraper conveyor, which is simple in structure, low in cost and good in use effect.

A second object of the present invention is to provide a method for detecting a rotation angle of a scraper by using the above embedded scraper rotation angle detection device, which can achieve real-time detection and high accuracy.

Technical Solution

In order to achieve the above objects, the technical solution adopted by the present invention is as follows: an embedded scraper rotation angle detection device for a scraper conveyor includes extensible detection devices, signal detection units and a remote processing unit, the extensible detection devices are connected with the signal detection units through connecting cables, and the two extensible detection devices and the two signal detection units are disposed at two ends of a scraper respectively.

Each of the extensible detection devices includes an outer cylinder, a guide ring I, a mandrel, a measuring end, a supporting ring, a guide ring II, a direction finding device, a measuring slip ring, a measuring probe and a bottom cover; a connecting thread is disposed on the outer surface of each of the outer cylinders, one end of each of the outer cylinders is fixed to the bottom cover, the other end of each of the outer cylinders is fixed to the guide ring I, each of the supporting ring is fixed on the inner wall of the outer cylinder, each of the guide rings II is fixed in the supporting ring, each of the mandrels sequentially penetrates through the guide ring I and the guide ring II, one end of each of the mandrels located an outer side of the outer cylinder is in threaded connection with the measuring end, a ball is disposed between one end of each of the mandrels located on the outer side of the outer cylinder and the measuring end, one end of each of the mandrels located on an inner side of the outer cylinder is fixedly connected with a connecting plate, guide rods are vertically fixed on each of the connecting plates, pre-tightening springs are disposed on the guide rods in a penetrating mode, and two ends of each of the pre-tightening springs make contact with the connecting plate and the bottom cover respectively; each of the measuring slip rings is fixed to the inner wall of the outer cylinder, the measuring slip rings take polyimide or polyester films as a base material, conductive copper wires uniformly distributed at intervals and communicating with each other are disposed on the surfaces of the measuring slip rings, each of the measuring probes is disposed at one end of the connecting plate, and the measuring probes make contact with the surfaces of the conductive copper wires disposed on the measuring slip rings; and each of the direction finding devices includes a guide ring III, a follow-up ring, a left polar plate, a right polar plate and a direction finding polar plate, the guide rings III are installed on the mandrels in a sleeving mode and fixedly connected with the follow-up rings, the left polar plates and the right polar plates are fixed to the outer sides of the follow-up rings and spaced by a certain distance, the front ends of the direction finding polar plates are located between the left polar plates and the right polar plates, and the tail ends of the direction finding polar plates are fixed in threaded holes in wall thickness directions of the outer cylinders.

Each of the signal detection units includes a signal detection module and a wireless transmission module, the remote processing unit includes a wireless receiving module and a signal display processing module, each of the signal detection modules is connected with the input end of the wireless transmission module, the output end of each of the wireless transmission modules is connected with the input end of the wireless receiving module, and the output end of the wireless receiving module is connected with the signal display processing module.

Preferably, the two guide rods are disposed and are symmetrical with respect to an extension line of each of the mandrels.

Further, one end of each of the balls makes contact with the end portion of the mandrel, and the other end of each of the balls is clamped into a round hole formed in the measuring end.

Further, a fixed interval value range of the conductive copper wires on the surface of each of the measuring slip rings is 0.1 mm–1 mm.

Further, after each of the direction finding polar plates makes contact with the left polar plate, a distance value range between the direction finding polar plate and the right polar plate is 0.02 mm-0.05 mm.

Further, each of the bottom covers is provided with a connecting cable hole.

A method for detecting a rotation angle of a scraper by using the above device includes the following steps:

1) respectively machining threaded holes matched with the outer surfaces of outer cylinders at two ends of the scraper, reserving arrangement spaces for signal detection units at two ends of a bottom of the scraper, machining wiring holes between extensible detection devices and the signal detection units in the scraper, respectively screwing the two extensible detection devices into the threaded holes machined in the scraper, respectively placing the two signal detection units in the reserved spaces of the scraper, and completing connection of connecting cables between the extensible detection devices and the signal detection units;

2) applying a pressure to mandrels of the extensible detection devices to enable the outer edges of balls to coincide with an outermost edge of the scraper, by taking the positions as initial zero positions of the extensible detection devices, conducting measuring probes and measuring slip rings in an initial state and contacting direction finding polar plates with left polar plates in the initial state, and manually measuring a distance L between outermost edges of two sides of the scraper at this moment;

3) putting the scraper equipped with the extensible detection devices in a middle trough, making the mandrels automatically stretch out to make contact with a trough ledge of the middle trough under the action of pre-tightening springs, making the signal detection units detect the contact condition of direction finding devices and the on-off condition of the measuring slip rings and the measuring probes in real time when moving, and setting a computational formula of a detection displacement ΔL of the extensible detection devices as:

$$\Delta L = (N_{left} - N_{right}) \times \Delta d,$$

wherein $N_{left}$ is the number of times obtained by detection that the measuring slip rings and the measuring probes are switched from off to on when the left polar plates make contact with the direction finding polar plates, $N_{right}$ is the number of times obtained by detection that the measuring slip rings and the measuring probes are switched from off to on when right polar plates make contact with the direction finding polar plates, and $\Delta d$ is a distance between adjacent conductive copper wires on the measuring slip rings;

4) when the scraper conveyor is not running and the scraper does not incline relative to the trough ledge of the middle trough, detecting movement displacements of the extensible detection devices at two ends by utilizing the computational formula in the step 3) to be recorded as $\Delta L_{01}$ and $\Delta L_{02}$ respectively, recording detected movement displacements of the extensible detection devices at two ends in the normal running process of the scraper conveyor as $\Delta L_{11}$ and $\Delta L_{12}$ respectively, detecting movement displacements of the extensible detection devices through the signal detection units in real time and sending out signals through wireless transmission modules; and 5) after a remote processing unit receives the movement displacements of the extensible detection devices, calculating a rotation angle α of the scraper as $$\arccos \frac{L + \Delta L_{01} + \Delta L_{02}}{L + \Delta L_{11} + \Delta L_{12}}$$

in real time, outputting and displaying the rotation angle value simultaneously, comparing the rotation angle value measured in real time with a set safety threshold, and sending out an alarm indication when the rotation angle value exceeds the safety threshold.

Advantageous Effect

Compared with the prior art, the present invention has the following beneficial effects:

the embedded scraper rotation angle detection device for the scraper conveyor provided by the present invention only needs to detect on-off type digital quantity signals in the extensible displacement detection process, and the signal detection processing is convenient and easy; the measuring slip rings can ensure the extremely small space size by means of a mature flexible circuit board manufacturing process, and meanwhile different intervals of the conductive copper wires can be conveniently set according to different measuring precision requirements; through the arrangement of the balls at the ends of the mandrels, the scraper rotation angle detection device is in rolling contact with the trough ledge of the middle trough, and the influence caused by friction is reduced; the movement direction change of the mandrels can be conveniently detected through the contact conditions between the direction finding polar plates and the left polar plates as well as between the direction finding polar plates and the right polar plates, and displacement detection errors caused by the reversing of the mandrels are eliminated; through the arrangement of the threads in the outer cylinders of the scraper rotation angle detection device, the whole detection device can be conveniently and easily embedded into an existing scraper, and the processing modification amount for the scraper is small; and the method for detecting the rotation angle based on the detection device is small in calculation amount, good in real-time performance and high in accuracy, and can effectively monitor the rotation angle condition of the scraper relative to the middle trough on line, operators conveniently master the operation state of the scraper conveyor in real time, and fault hidden dangers such as chain loosening, chain skipping and chain breaking are prevented in advance. The whole device is simple and reliable in structure, low in cost, small in space size, high in adaptability, good in use effect and wide in practicability.

Figure 1:
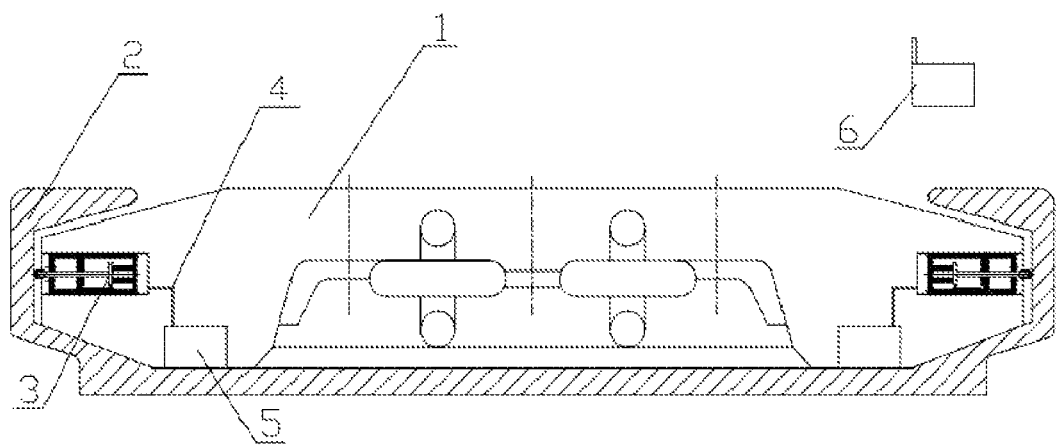
FIG. 1 is a schematic diagram of an embedded scraper rotation angle detection device.

In the drawings: 1—scraper, 2—middle trough, 3—extensible detection device, 31—outer cylinder, 32—guide ring I, 33—mandrel, 34—measuring end, 35—ball, 36—supporting ring, 37—guide ring II, 38—direction finding device, 381—guide ring III, 382—follow-up ring, 383—left polar plate, 384—right polar plate, 385—direction finding polar plate, 39—measuring slip ring, 310—connecting plate, 311—measuring probe, 312—guide rod, 313—pre-tightening spring, 314—bottom cover, 4—connecting cable, 5—signal detection unit, and 6—remote processing unit.

DETAILED DESCRIPTION OF THE INVENTION

The present invention is further described in detail below with reference to the accompanying drawings and specific embodiments.

As shown in FIG. 1, an embedded scraper rotation angle detection device for a scraper conveyor includes extensible detection devices 3, signal detection units 5 and a remote processing unit 6, the extensible detection devices 3 are connected with the signal detection units 5 through connecting cables 4, and the two extensible detection devices 3 and the two signal detection units 5 are disposed at two ends of a scraper 1 respectively.

Figure 2:
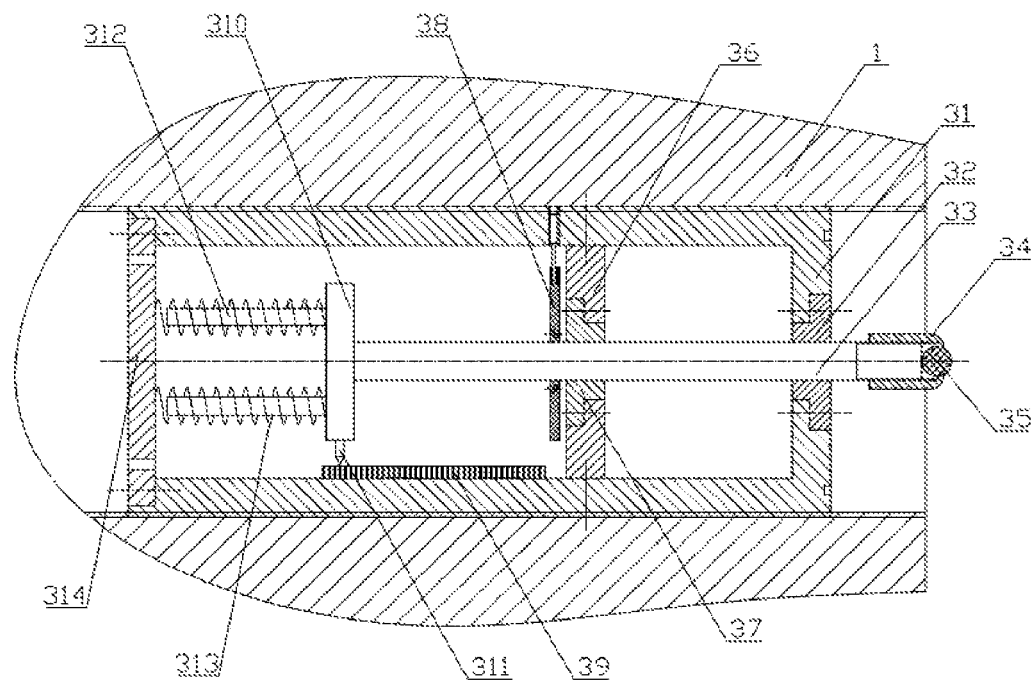
FIG. 2 is a structural diagram of an extensible detection device.
Figure 3:
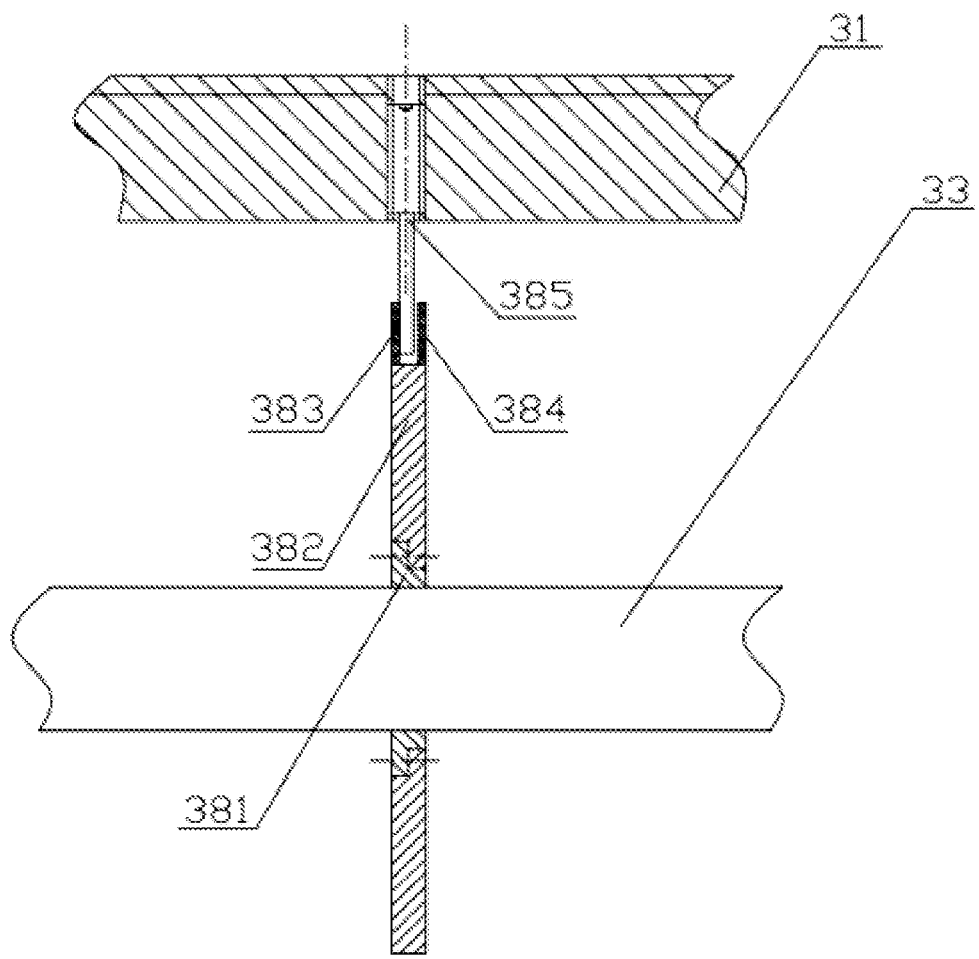
FIG. 3 is a partial enlarged structural diagram of a direction finding device.

As shown in FIG. 1 and FIG. 2, each of the extensible detection devices 3 includes an outer cylinder 31, a guide ring I 32, a mandrel 33, a measuring end 34, a supporting ring 36, a guide ring II 37, a direction finding device 38, a measuring slip ring 39, a measuring probe 311 and a bottom cover 314; a connecting thread is disposed on the outer surface of each of the outer cylinders 31, one end of each of the outer cylinders 31 is fixed to the bottom cover 314, the other end of each of the outer cylinders 31 is fixed to the guide ring I 32, each of the supporting rings 36 is fixed on the inner wall of the outer cylinder 31, each of the guide rings II 37 is fixed in the supporting ring 36, each of the mandrels 33 sequentially penetrates through the guide ring I 32 and the guide ring II 37, one end of each of the mandrels 33 located on an outer side of the outer cylinder 31 is in threaded connection with the measuring end 34, a ball 35 is disposed between one end of each of the mandrels 33 located on the outer side of the outer cylinder 31 and the measuring end 34, one end of each of the balls 35 makes contact with the end portion of the mandrel 33, the other end of each of the balls 35 is clamped in a round hole formed in the measuring end 34, one end of each of the mandrels 33 located on an inner side of the outer cylinder 31 is fixedly connected with a connecting plate 310, guide rods 312 are vertically fixed on each of the connecting plates 310, preferably, the two guide rods 312 are disposed and are symmetrical with respect to an extension line of each of the mandrels 33, pre-tightening springs 313 are disposed on the guide rods 312 in a penetrating mode, and two ends of each of the pre-tightening springs 313 make contact with the connecting plate 310 and the bottom cover 314 respectively; each of the measuring slip ring 39 is fixed to the inner wall of the outer cylinder 31, the measuring slip rings 39 take polyimide or polyester films as a base material, conductive copper wires uniformly distributed at intervals and communicating with each other are disposed on the surfaces of the measuring slip rings 39, and preferably, a fixed interval value range of the conductive copper wires on the surface of each of the measuring slip rings 39 is 0.1 mm-1 mm; each of the measuring probes 311 is disposed at one end of the connecting plate 310, and the measuring probes 311 make contact with the surfaces of the conductive copper wires disposed on the measuring slip rings 39; and as shown in FIG. 2 and FIG. 3, each of the direction finding device 38 includes a guide ring III 381, a follow-up ring 382, a left polar plate 383, a right polar plate 384 and a direction finding polar plate 385, the guide rings III 381 are installed on the mandrels 33 in a sleeving mode and fixedly connected with the follow-up rings 382, the left polar plates 383 and the right polar plates 384 are fixed to the outer sides of the follow-up rings 382 and spaced by a certain distance, the front ends of the direction finding polar plates 385 are located between the left polar plates 383 and the right polar plates 384, after each of the direction finding polar plates 385 makes contact with the left polar plate 383, a distance value range between the direction finding polar plate 385 and the right polar plate 384 is 0.02 mm-0.05 mm, and the tail ends of the direction finding polar plates 385 are fixed in threaded holes in the wall thickness directions of the outer cylinders 31.

Each of the signal detection units 5 includes a signal detection module and a wireless transmission module, and the remote processing unit 6 includes a wireless receiving module and a signal display processing module; the signal detection modules are used to detect the contact condition of the direction finding devices 38 and the on-off condition of the measuring slip rings 39 and the measuring probes 311 in real time, detect movement displacements of the extensible detection devices 3 in real time, and send out signals through the wireless transmission modules; and the wireless transmission modules and the wireless receiving module are used for data transmission, and the signal display processing module is used to calculate a rotation angle value of the scraper 1 in real time, output and display the rotation angle value simultaneously, compare the rotation angle value measured in real time with a set safety threshold, and send out an alarm indication when the rotation angle value exceeds the safety threshold.

The signal detection modules are connected with the input ends of the wireless transmission modules, the output ends of the wireless transmission modules are connected with the input end of the wireless receiving module, the output end of the wireless receiving module is connected with the signal display processing module, and data communication is achieved through wireless connection between the wireless transmission modules and the wireless receiving module.

Further, the bottom covers 314 are provided with connecting cable holes.

Figure 4:
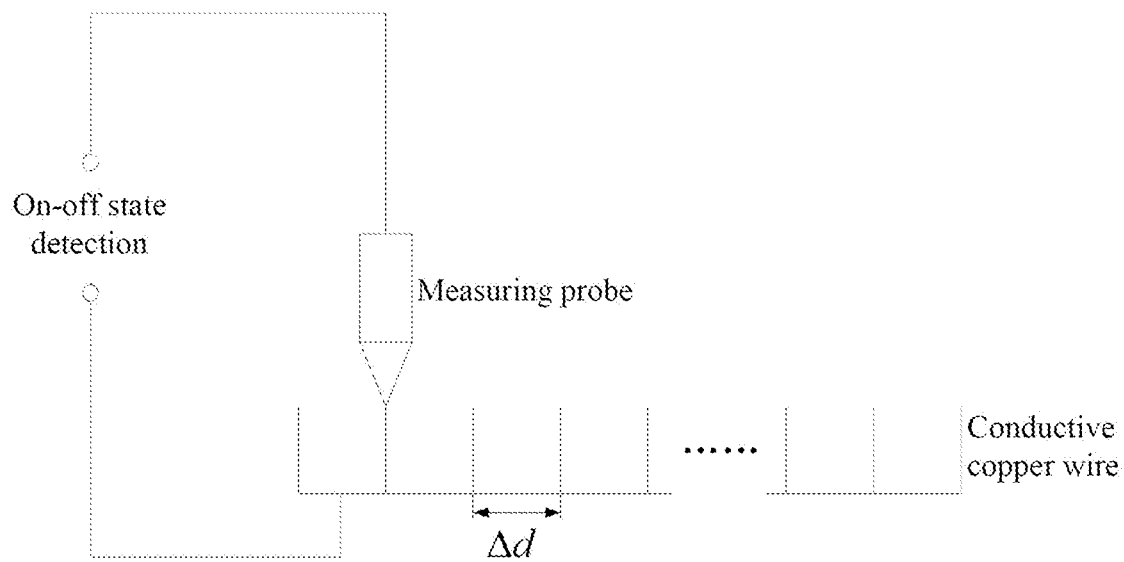
FIG. 4 is a schematic diagram of an on-off state of a measuring slip ring and a measuring probe.
Figure 5:
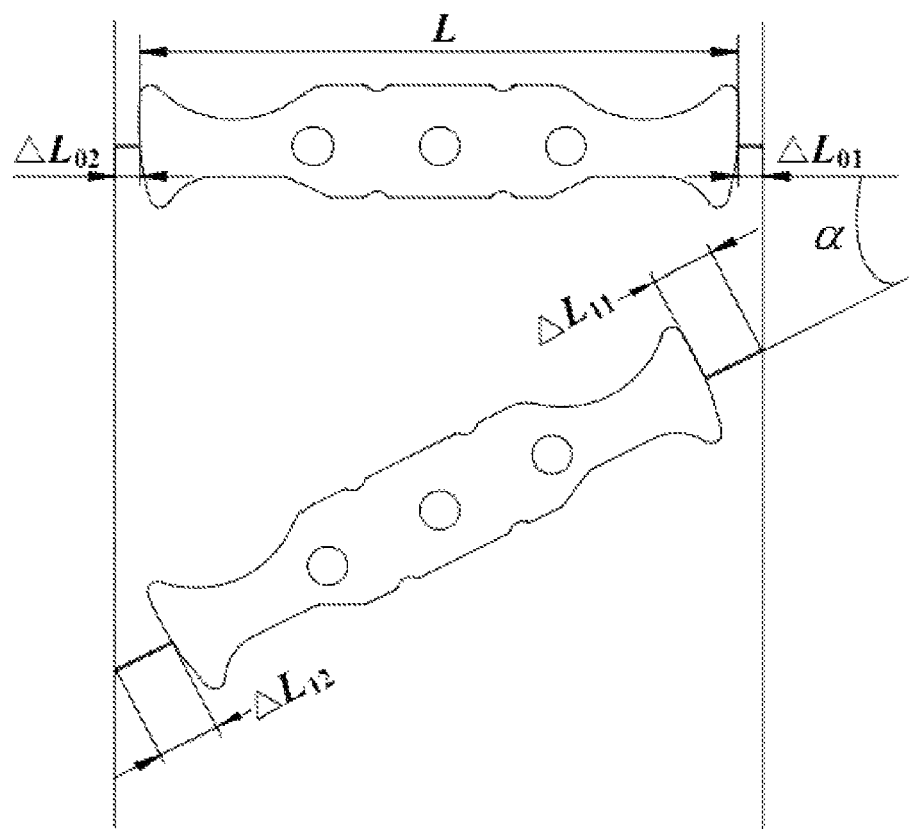
FIG. 5 is a schematic diagram of computation of a rotation angle of a scraper.

As shown in FIG. 4 and FIG. 5, a method for detecting a rotation angle of a scraper by utilizing the above device includes the following steps:

1) threaded holes matched with the outer surfaces of outer cylinders 31 are respectively machined at two ends of the scraper 1, arrangement spaces for signal detection units 5 are reserved at two ends of the bottom of the scraper 1, wiring holes between extensible detection devices 3 and the signal detection units 5 are machined in the scraper 1, the two extensible detection devices 3 are screwed into the threaded holes machined in the scraper 1 respectively, the two signal detection units 5 are placed in the reserved spaces of the scraper 1 respectively, and the connection of connecting cables 4 between the extensible detection devices 3 and the signal detection units 5 is completed;

2) a pressure is applied to mandrels 33 of the extensible detection devices 3 to enable the outer edges of balls 35 to coincide with the outermost edge of the scraper 1, by taking the positions as initial zero positions of the extensible detection devices 3, measuring probes 311 and measuring slip rings 39 are conducted in an initial state and direction finding polar plates 385 make contact with left polar plates 383 in the initial state, and a distance L between the outermost edges of two sides of the scraper 1 at this moment is manually measured;

3) the scraper 1 equipped with the extensible detection devices 3 is put in a middle trough 2, the mandrels 33 automatically stretch out to make contact with a trough ledge of the middle trough 2 under the action of pre-tightening springs 313, the signal detection units 5 detect the contact condition of direction finding devices 38 and the on-off condition of the measuring slip rings 39 and the measuring probes 311 in real time when moving, and a computational formula of a detection displacement ΔL of the extensible detection devices 3 is as follows:

$$\Delta L=(N_{left}-N_{right})\times \Delta d,$$

wherein $N_{left}$ is the number of times obtained by detection that the measuring slip rings 39 and the measuring probes 311 are switched from off to on when the left polar plates 383 make contact with the direction finding polar plates 385, $N_{right}$ is the number of times obtained by detection that the measuring slip rings 39 and the measuring probes 311 are switched from off to on when right polar plates 384 make contact with the direction finding polar plates 385, and Δd is a distance between adjacent conductive copper wires on the measuring slip rings 39;

4) when the scraper conveyor is not running and the scraper 1 does not incline relative to the trough ledge of the middle trough 2, movement displacements of the extensible detection devices 3 at the two ends are detected by utilizing the computational formula in the step 3) and are recorded as $\Delta L_{01}$ and $\Delta L_{02}$ respectively, detected movement displacements of the extensible detection devices 3 at the two ends in the normal running process of the scraper conveyor are recorded as $\Delta L_{11}$ and $\Delta L_{12}$ respectively, the signal detection units 5 detect movement displacements of the extensible detection devices in real time, and signals are sent out through wireless transmission modules; and 5) after a remote processing unit 6 receives the movement displacements of the extensible detection devices 3, a rotation angle α of the scraper 1 is calculated as $$\arccos \frac{L+\Delta L_{01}+\Delta L_{02}}{L+\Delta L_{11}+\Delta L_{12}}$$

in real time, the rotation angle value is output and displayed simultaneously, the rotation angle value measured in real time is compared with a set safety threshold, and an alarm indication is sent out when the rotation angle value exceeds the safety threshold

What is claimed is:

1. An embedded scraper rotation angle detection device for a scraper conveyor, wherein the embedded scraper rotation angle detection device for the scraper conveyor comprises extensible detection devices (3), signal detection units (5) and a remote processing unit (6), the extensible detection devices (3) are connected with the signal detection units (5) through connecting cables (4), and two extensible detection devices (3) and two signal detection units (5) are respectively disposed at two ends of a scraper (1);

each of the extensible detection devices (3) comprises an outer cylinder (31), a guide ring I (32), a mandrel (33), a measuring end (34), a supporting ring (36), a guide ring II (37), a direction finding device (38), a measuring slip ring (39), a measuring probe (311) and a bottom cover (314); a connecting thread is disposed on an outer surface of each of the outer cylinders (31), one end of each of the outer cylinders (31) is fixed to the bottom cover (314), the other end of each of the outer cylinders (31) is fixed to the guide ring I (32), each of the supporting rings (36) is fixed on an inner wall of the outer cylinder (31), each of the guide rings II (37) is fixed in the supporting ring (36), each of the mandrels (33) sequentially penetrates through the guide ring I (32) and the guide ring II (37), one end of each of the mandrels (33) located on an outer side of the outer cylinder (31) is in threaded connection with the measuring end (34), a ball (35) is disposed between one end of each of the mandrels (33) located on the outer side of the outer cylinder (31) and the measuring end (34), one end of each of the mandrels (33) located on an inner side of the outer cylinder (31) is fixedly connected with a connecting plate (310), guide rods (312) are vertically fixed on each of the connecting plates (310), pre-tightening springs (313) are disposed on the guide rods (312) in a penetrating mode, and two ends of each of the pre-tightening springs (313) make contact with the connecting plate (310) and the bottom cover (314) respectively; each of the measuring slip rings (39) is fixed to the inner wall of the outer cylinder (31), the measuring slip rings (39) take polyimide or polyester films as a base material, conductive copper wires uniformly distributed at intervals and communicating with each other are disposed on surfaces of the measuring slip rings (39), each of the measuring probes (311) is disposed at one end of the connecting plate (310), and the measuring probes (311) make contact with surfaces of the conductive copper wires disposed on the measuring slip rings (39); and each of the direction finding device (38) comprises a guide ring III (381), a follow-up ring (382), a left polar plate (383), a right polar plate (384) and a direction finding polar plate (385), the guide rings III (381) are installed on the mandrels (33) in a sleeving mode and fixedly connected with the follow-up rings (382), the left polar plates (383) and the right polar plates (384) are fixed to outer sides of the follow-up rings (382) and spaced by a certain distance, front ends of the direction finding polar plates (385) are located between the left polar plates (383) and the right polar plates (384), and tail ends of the direction finding polar plates (385) are fixed in threaded holes in wall thickness directions of the outer cylinders (31); and each of the signal detection units (5) comprises a signal detection module and a wireless transmission module, the remote processing unit (6) comprises a wireless receiving module and a signal display processing module, the signal detection modules are connected with input ends of the wireless transmission modules, output ends of the wireless transmission modules are connected with an input end of the wireless receiving module, and an output end of the wireless receiving module is connected with the signal display processing module.

2. The embedded scraper rotation angle detection device for the scraper conveyor according to claim 1, wherein the two guide rods (312) are disposed and are symmetrical with respect to an extension line of each of the mandrels (33).

3. The embedded scraper rotation angle detection device for the scraper conveyor according to claim 1, wherein one end of each of the balls (35) makes contact with an end portion of the mandrel (33), and the other end of each of the balls (35) is clamped into a round hole formed in the measuring end (34).

4. The embedded scraper rotation angle detection device for the scraper conveyor according to claim 1, wherein a fixed interval value range of the conductive copper wires on the surface of each of the measuring slip rings (39) is 0.1 mm-1 mm.

5. The embedded scraper rotation angle detection device for the scraper conveyor according to claim 1, wherein after each of the direction finding polar plates (385) makes contact with the left polar plate (383), a distance value range between the direction finding polar plate (385) and the right polar plate (384) is 0.02 mm-0.05 mm.

6. The embedded scraper rotation angle detection device for the scraper conveyor according to claim 1, wherein the bottom covers (314) are provided with connecting cable holes.

7. A method for detecting a rotation angle of a scraper by utilizing the embedded scraper rotation angle detection device for the scraper conveyor according to claim 1, wherein the method comprises the following steps:
1) respectively machining threaded holes matched with outer surfaces of outer cylinders (31) at two ends of the scraper (1), reserving arrangement spaces for signal detection units (5) at two ends of a bottom of the scraper (1), machining wiring holes between extensible detection devices (3) and the signal detection units (5) in the scraper (1), respectively screwing the two extensible detection devices (3) into the threaded holes machined in the scraper (1), respectively placing the two signal detection units (5) in the reserved spaces of the scraper (1), and completing connection of connecting cables (4) between the extensible detection devices (3) and the signal detection units (5);
2) applying a pressure to mandrels (33) of the extensible detection devices (3) to enable outer edges of balls (35) to coincide with an outermost edge of the scraper (1), by taking positions as initial zero positions of the extensible detection devices (3), conducting measuring probes (311) and measuring slip rings (39) in an initial state and contacting direction finding polar plates (385) with left polar plates (383) in the initial state, and manually measuring a distance L between outermost edges of two sides of the scraper (1) at this moment;
3) putting the scraper (1) equipped with the extensible detection devices (3) in a middle trough (2), making the mandrels (33) automatically stretch out to make contact with a trough ledge of the middle trough (2) under an action of pre-tightening springs (313), making the signal detection units (5) detect a contact condition of direction finding devices (38) and an on-off condition of the measuring slip rings (39) and the measuring probes (311) in real time when moving, and setting a computational formula of a detection displacement ΔL of the extensible detection devices (3) as:

$$\Delta L = (N_{left} - N_{right}) \times \Delta d,$$

wherein $N_{left}$ is the number of times obtained by detection that the measuring slip rings (39) and the measuring probes (311) are switched from off to on when the left polar plates (383) make contact with the direction finding polar plates (385), $N_{right}$ is the number of times obtained by detection that the measuring slip rings (39) and the measuring probes (311) are switched from off to on when right polar plates (384) make contact with the direction finding polar plates (385), and Δd is a distance between adjacent conductive copper wires on the measuring slip rings (39);
4) when the scraper conveyor is not running and the scraper (1) does not incline relative to the trough ledge of the middle trough (2), detecting movement displacements of the extensible detection devices (3) at two ends by utilizing the computational formula in the step 3) to be recorded as $\Delta L_{01}$ and $\Delta L_{02}$ respectively, recording detected movement displacements of the extensible detection devices (3) at the two ends in a normal running process of the scraper conveyor as $\Delta L_{11}$ and $\Delta L_{12}$ respectively, detecting movement displacements of the extensible detection devices (3) through the signal detection units (5) in real time, and sending out signals through wireless transmission modules; and
5) after a remote processing unit (6) receives the movement displacements of the extensible detection devices (3), calculating a rotation angle α of the scraper (1) as $$\arccos \frac{L + \Delta L_{01} + \Delta L_{02}}{L + \Delta L_{11} + \Delta L_{12}}$$

in real time, outputting and displaying the rotation angle value simultaneously, comparing the rotation angle value measured in real time with a set safety threshold, and sending out an alarm indication when the rotation angle value exceeds the safety threshold.

\* \* \* \* \*